(12) United States Patent
Nagasawa et al.

(10) Patent No.: US 10,008,803 B2
(45) Date of Patent: Jun. 26, 2018

(54) CONNECTOR FOR A CAMERA WITH REDUCED DIMENSIONS IN A FITTING DIRECTION

(71) Applicant: Yazaki Corporation, Minato-ku, Tokyo (JP)

(72) Inventors: Masanori Nagasawa, Makinohara (JP); Fumihiro Shiiba, Utsunomiya (JP)

(73) Assignee: YAZAKI CORPORATION, Tokyo (JP)

( * ) Notice: Subject to any disclaimer, the term of this patent is extended or adjusted under 35 U.S.C. 154(b) by 0 days. days.

(21) Appl. No.: 15/453,247

(22) Filed: Mar. 8, 2017

(65) Prior Publication Data

US 2017/0264047 A1  Sep. 14, 2017

(30) Foreign Application Priority Data

Mar. 9, 2016  (JP) ................. 2016-045962

(51) Int. Cl.
| | |
|---|---|
| *H01R 13/627* | (2006.01) |
| *H04N 5/225* | (2006.01) |
| *H01R 13/506* | (2006.01) |
| *H04N 7/10* | (2006.01) |

(52) U.S. Cl.
CPC ....... *H01R 13/6272* (2013.01); *H01R 13/506* (2013.01); *H04N 5/2252* (2013.01); *H01R 2201/26* (2013.01); *H04N 7/10* (2013.01)

(58) Field of Classification Search
CPC ............ H01R 13/6271; H01R 13/6272; H01R 13/6275; H04N 5/2252
USPC ................................................ 439/357, 352
See application file for complete search history.

(56) References Cited

U.S. PATENT DOCUMENTS

| | | | | |
|---|---|---|---|---|
| 7,275,951 B2* | 10/2007 | Shigeta | .............. | H01R 13/6271 439/352 |
| 7,806,715 B2* | 10/2010 | Zheng | ................. | H01R 13/641 439/352 |
| 8,235,744 B1* | 8/2012 | Liptak | ................. | H01R 13/639 439/352 |
| 8,956,192 B2* | 2/2015 | Eckel | .................... | H01R 13/44 439/686 |
| 9,054,458 B1* | 6/2015 | Ng | ........................ | H01R 13/641 |
| 9,099,812 B2* | 8/2015 | Sugimoto | .............. | H01R 13/64 |

(Continued)

FOREIGN PATENT DOCUMENTS

| | | |
|---|---|---|
| JP | 2011-46331 A | 3/2011 |
| JP | 2015-170526 A | 9/2015 |

*Primary Examiner* — Hae Moon Hyeon
(74) *Attorney, Agent, or Firm* — Sughrue Mion, PLLC

(57) ABSTRACT

A connector for a camera includes a first connector housing accommodating a first terminal, and a second connector housing accommodating a second terminal connected to the first terminal. The first connector housing includes a flange configured to be contact with a terminal-edge surface of a camera housing which is assembled, a first fitting portion fitted in the second connector housing and disposed at a shifted position shifted from one surface side of the flange, and a locked portion disposed on a surface facing in a first direction orthogonal to a fitting direction. The second connector housing includes a second fitting portion fitted to the first fitting portion, a locking arm locking to the locked portion, and a locking protective wall including a projecting protective wall projecting to a front side in the fitting direction which protects the locking arm.

3 Claims, 7 Drawing Sheets

(56) References Cited

U.S. PATENT DOCUMENTS

| | | | |
|---|---|---|---|
| 9,425,549 B2 * | 8/2016 | Sekino | H01R 13/6272 |
| 9,787,014 B2 * | 10/2017 | Nagasawa | H01R 13/4362 |
| 2015/0255908 A1 | 9/2015 | Takamura | |

* cited by examiner

PRIOR ART

CONNECTOR FOR A CAMERA WITH REDUCED DIMENSIONS IN A FITTING DIRECTION

CROSS REFERENCE TO RELATED APPLICATIONS

This application claims priority from Japanese Patent Application No. 2016-045962 filed on Mar. 9, 2016, the entire contents of which are incorporated herein by reference.

BACKGROUND OF THE INVENTION

<Field of the Invention>

The present invention relates to a connector for a camera in which a first connector housing is fitted in a second connector housing.

<Description of Related Art>

In a related art, as a connector for a camera which is used for electrical connection of a vehicle-mounted camera or the like, a connector, in which an electrical connecting portion of a camera functioning component is disposed in a camera housing, and an electrical connecting member such as an electric wire is drawn out of the camera housing, has been provided.

For example, Patent Document 1 (JP-A-2011-46331) discloses a vehicle-mounted camera apparatus in which a connector provided on a terminal portion of a wire is disposed in a front case as a camera housing in a waterproof manner, and the wire is drawn outside through a through-hole of a rear case in a waterproof manner.

In addition, Patent Document 2 (JP-A-2015-170526) discloses a connector for a camera that includes a connector housing that is provided with a terminal fitting and a flange with which a terminal-edge surface of a camera housing comes into contact such that the camera housing is assembled with the connector housing.

For example, in a case where an electric wire W drawn outside a terminal fitting C is connected, as illustrated in FIGS. 7A and 7B, a connector 100 for a camera disclosed in Patent Document 2 is configured to include a first connector housing 110 that is provided with a first terminal (not illustrated) and the flange with which the terminal-edge surface of a camera housing (not illustrated) comes into contact such that the camera housing is assembled with the first connector housing, and a second connector housing 120 in which the terminal fitting C is accommodated as a second terminal that is connected to the first terminal, and which is provided with a locking arm 121 that is locked to a locked portion 112 provided in the first connector housing 110 and a locking protective wall 122 that protects the locking arm 121 with a wall including a projecting protective wall 122a projecting to a front side in a fitting direction toward the first connector housing 110.

[Patent Document 1] JP-A-2011-46331
[Patent Document 2] JP-A-2015-170526

However, in the connector 100 for a camera that is provided with the locking protective wall 122 described above, since the projecting protective wall 122a is disposed not to come into contact with the flange 111, a fitting length H (refer to FIG. 7(b)) is long. As a result, a problem arises in that a dimension of the connector in the fitting direction of the first and second connector housings 110 and 120 increases.

SUMMARY

One or more embodiments provide a connector for a camera in which it is possible to reduce a dimension in a fitting direction of a first connector housing and a second connector housing which is locked to the first connector housing via a locking arm protected with a wall of a locking protective wall.

In accordance with one or more embodiments, a connector for a camera comprising:

a first connector housing accommodating a first terminal electrically connected to a camera functioning component; and a second connector housing accommodating a second terminal connected to the first terminal, wherein the first connector housing includes a flange configured to be contact with a terminal-edge surface of a camera housing which is assembled, a first fitting portion fitted in the second connector housing and disposed at a shifted position shifted from one surface side of the flange, and a locked portion disposed on a surface facing in a first direction orthogonal to a fitting direction, wherein the second connector housing includes a second fitting portion fitted to the first terminal, a locking arm which locks the locked portion, and a locking protective wall including a projecting protective wall projecting to a front side in the fitting direction which protects the locking arm, wherein the locking arm and the locking protective wall are located in the first direction and on a surface of the second fitting portion, wherein, when the second connector housing is fitted to the first connector housing, the projecting protective wall overlaps the flange in the first direction orthogonal to the fitting direction and the locking arm is locked, and wherein the flange includes a protective-wall avoiding portion which avoids an overlapping portion of the flange with the projecting protective wall.

In the connector of one or more embodiments, the connector for the camera, the protective-wall avoiding portion may include a recessed edge surface which faces a side wall of the projecting protective wall through a space, in a state that the first connector housing is fitted in the second connector housing.

In the connector of one or more embodiments, the projecting protective wall may project from a fitting end surface side of the second fitting portion in the fitting direction so as to reduce a overlapping portion of the flange which overlaps an outer side of the first fitting portion.

Advantage of the Invention

In the connector for a camera according to a first aspect of the present invention, the projecting protective wall is provided at the position shifted to the one-side surface side of the flange, thereby the overlapping portion with the flange is reduced, and the locking arm and the locked portion are locked to each other in a state in which the projecting protective wall overlaps the flange in the direction orthogonal to the fitting direction. Therefore, it is possible to reduce the dimension in the fitting direction of the first connector housing and the second connector housing which is locked to the first connector housing via the locking arm protected with the wall of the locking protective wall.

In the connector for a camera according to a second aspect of the present invention, in a case where an external force in a width direction of the protective-wall avoiding portion is loaded to the second terminal, both side walls of the projecting protective wall can come into contact with the recessed edge surfaces such that the protective-wall avoiding portion can receive the load produced due to the external force. As a result, it is possible to disperse the external force loaded in the width direction of the protective-wall avoiding portion. Further, since the projecting protective wall enters a recessed portion formed of the protective-wall avoiding portion in the flange, the projecting protective wall is disposed at the position shifted to the one-side surface side of the flange, and thereby it is possible to prevent the dimension in a direction parallel to the shifting direction from increasing.

In the connector for a camera according to a third aspect of the present invention, in the fitting state of the first connector housing in the second connector housing, since the overlapping portion between the first fitting portion and the projecting protective wall is reduced such that it is possible to see an outer surface of the first fitting portion, which is viewed on the front side in the fitting direction from an end surface of a fitting port of the second fitting portion, without interference of the projecting protective wall, it is possible to easily see and check the fitting state of the first connector housing in the second connector housing.

BRIEF DESCRIPTION OF THE DRAWINGS

FIG. 6A is a perspective view, FIG. 6B is a view from one side surface on a locking arm side, and FIG. 6C is a side view.

DETAILED DESCRIPTION

Hereinafter, a preferred example of a connector for a camera according to the invention will be described in detail with reference to the present figures.

Figure 1:
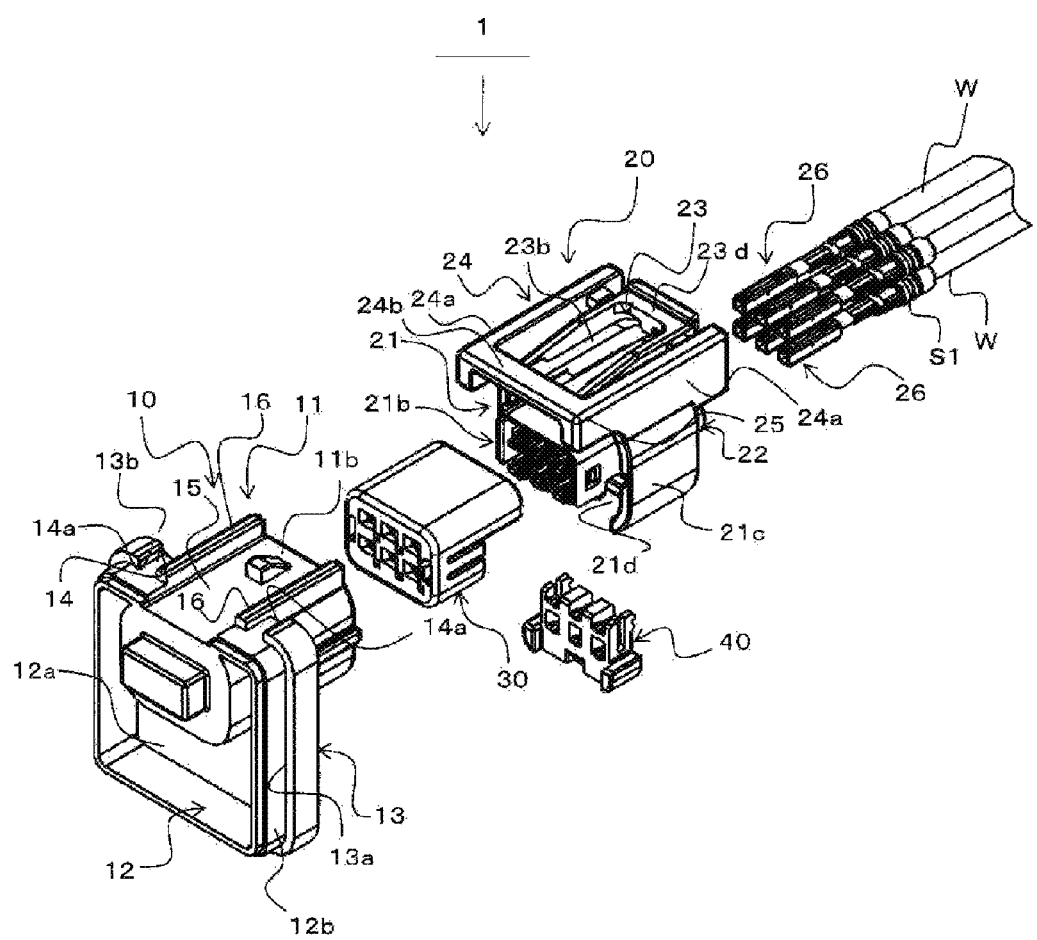
FIG. 1 is an exploded perspective view of a connector for a camera according to an example of the present invention.
Figure 2:
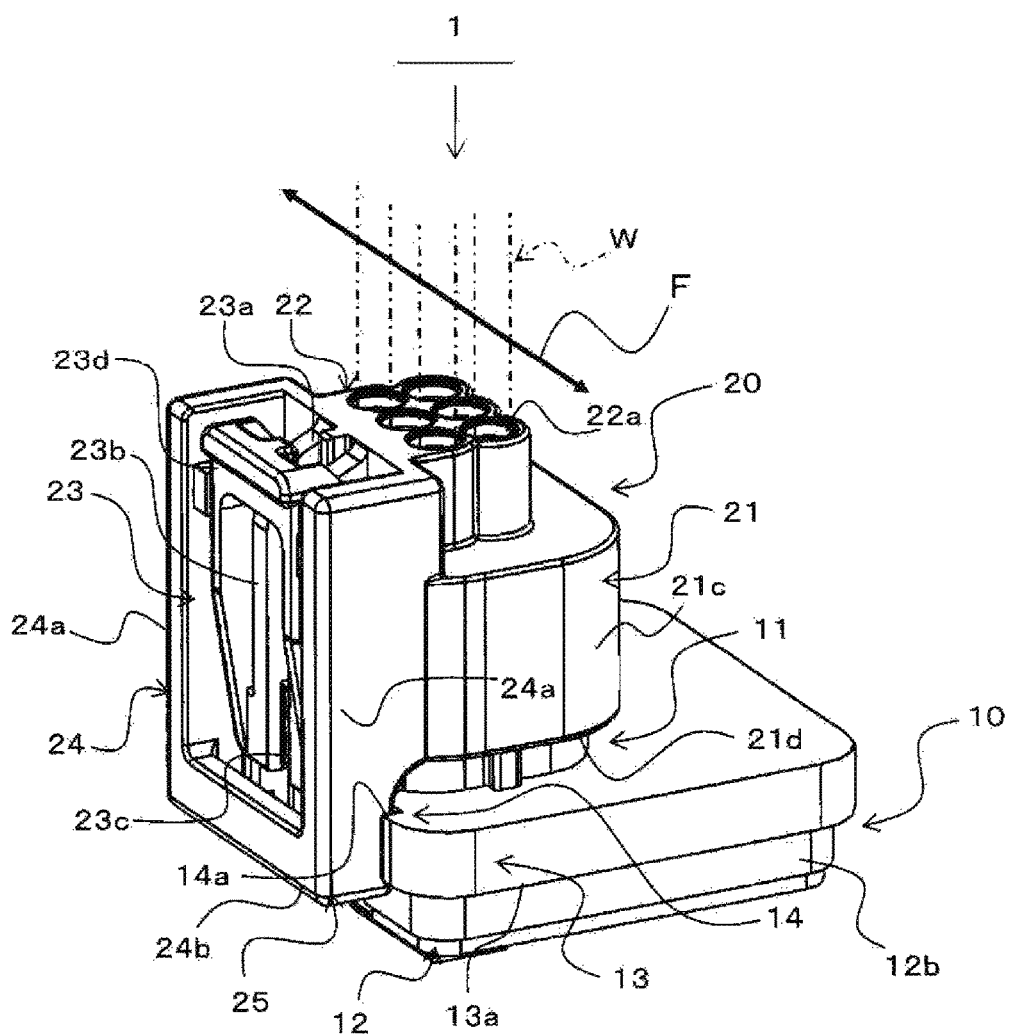
FIG. 2 is a perspective view of the connector for a camera.
Figure 3:
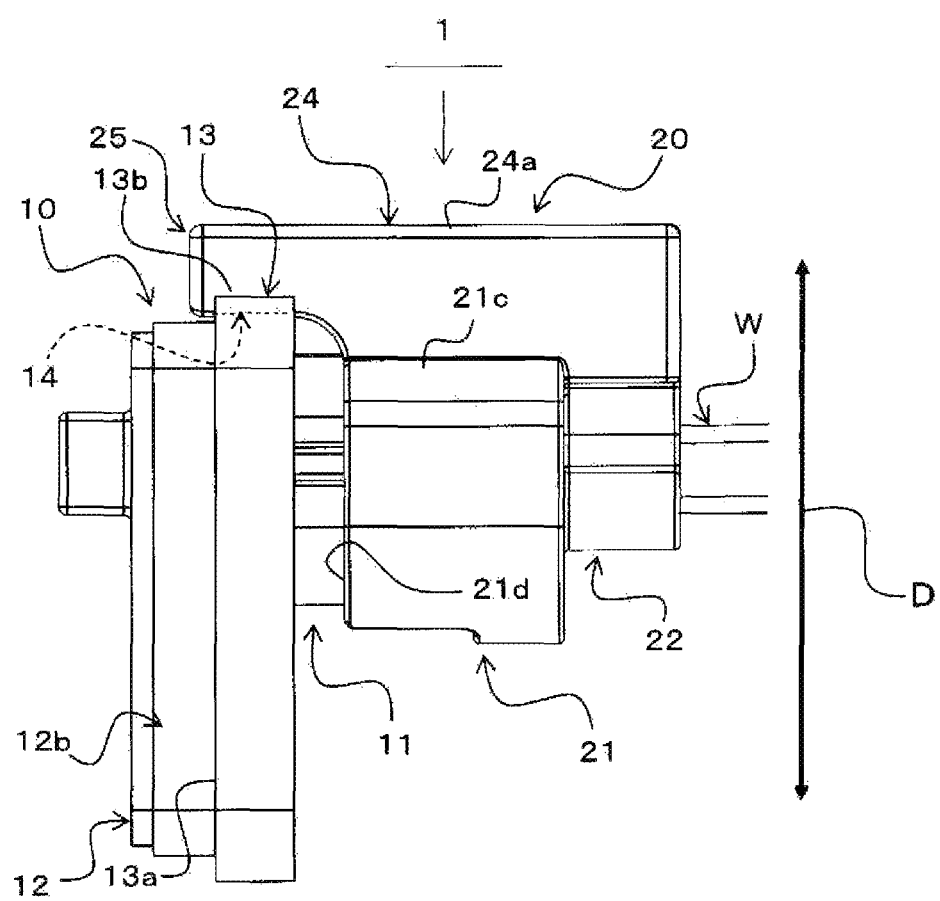
FIG. 3 is a side view of the connector for a camera.
Figure 4:
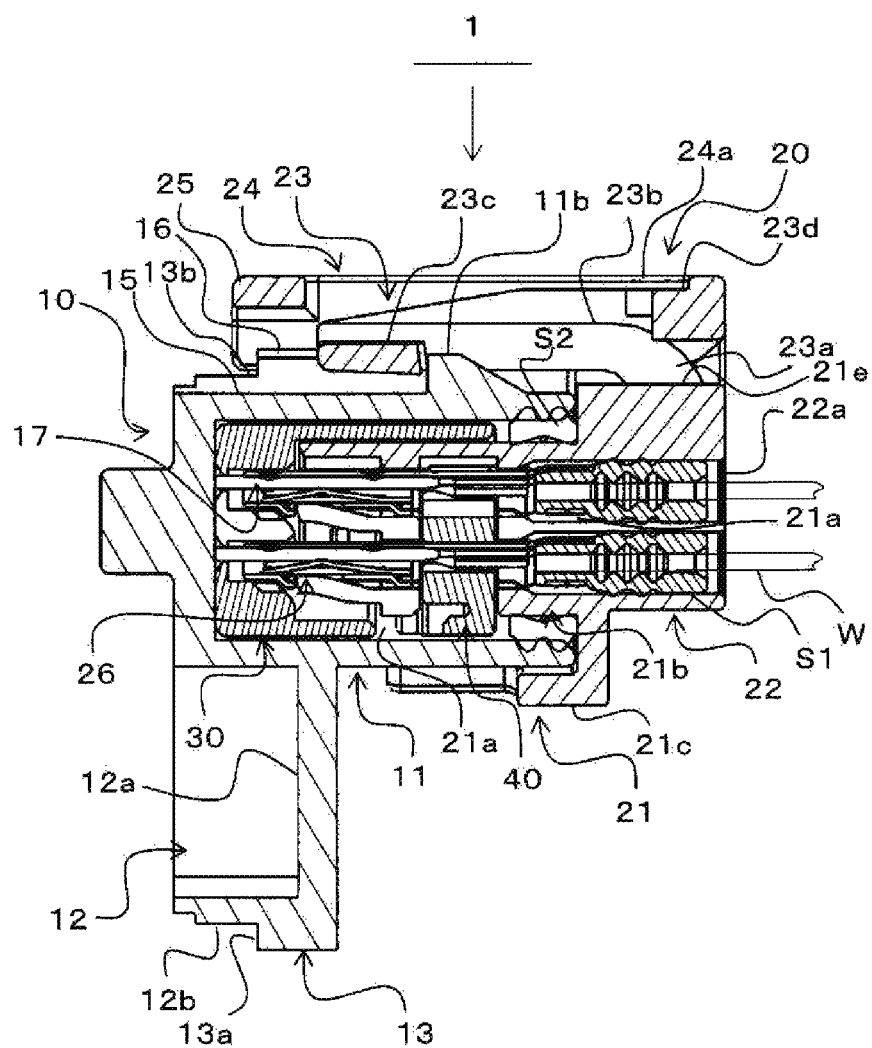
FIG. 4 is a sectional view of the connector for a camera.
Figure 5:
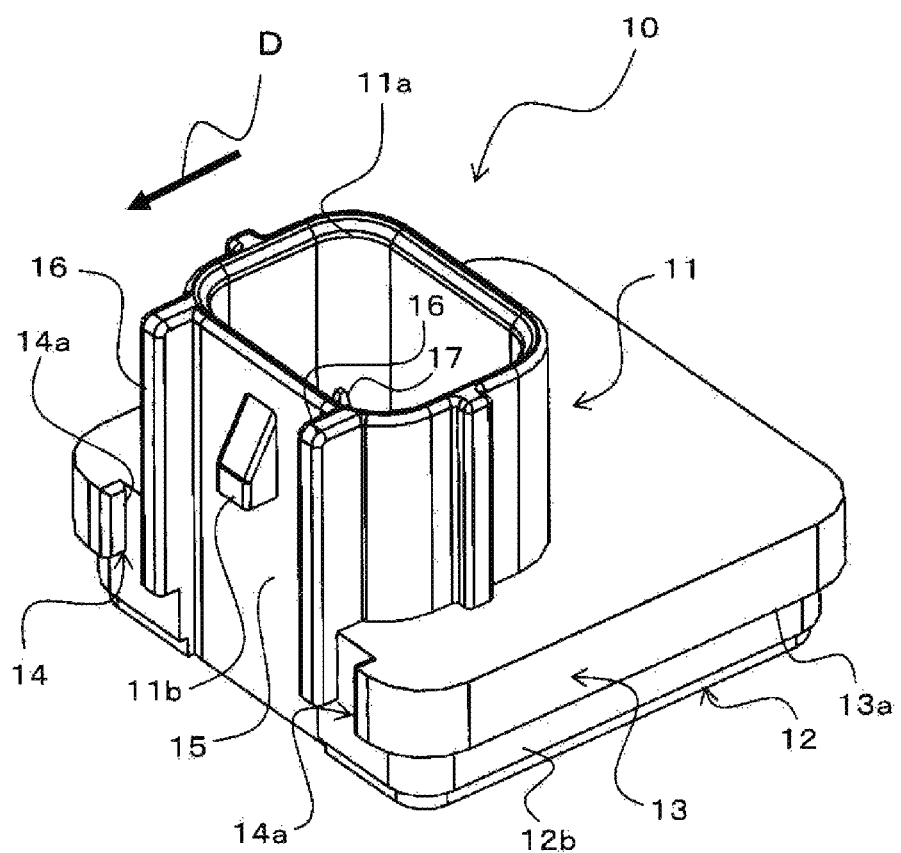
FIG. 5 is a perspective view of a first connector housing illustrated in FIG. 1.
Figure 6A:
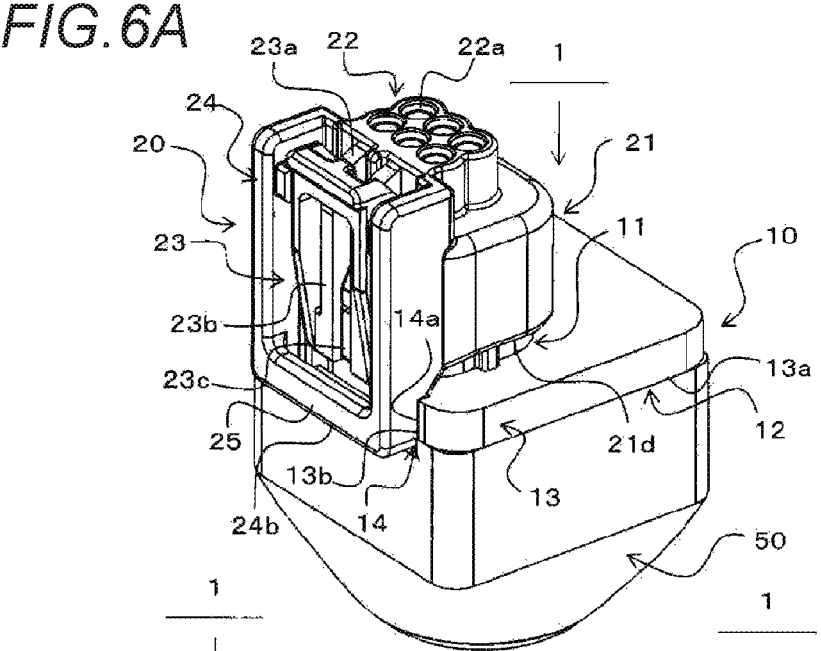
FIGS. 6A to 6C illustrate the connector for a camera in a state in which a camera housing is attached.
Figures 6B, 6C:
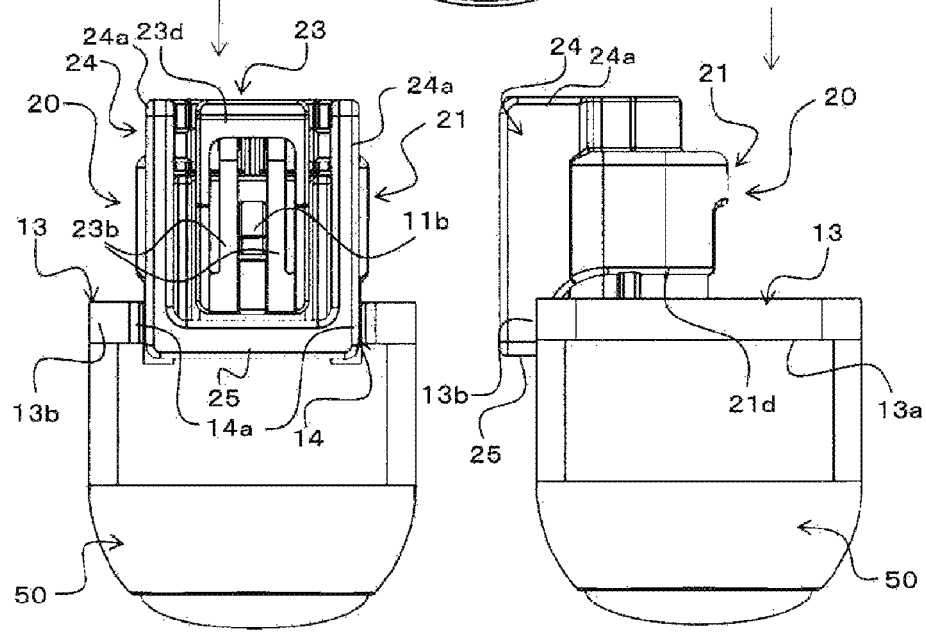
Figure 7A:
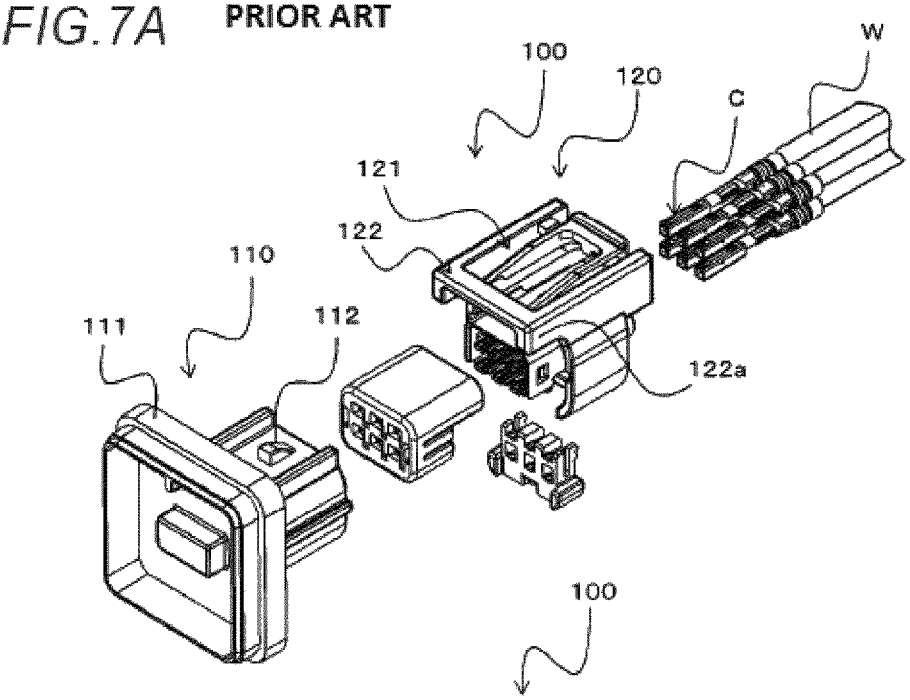
FIGS. 7A and 7B are views for illustrating the related art.
Figure 7B:
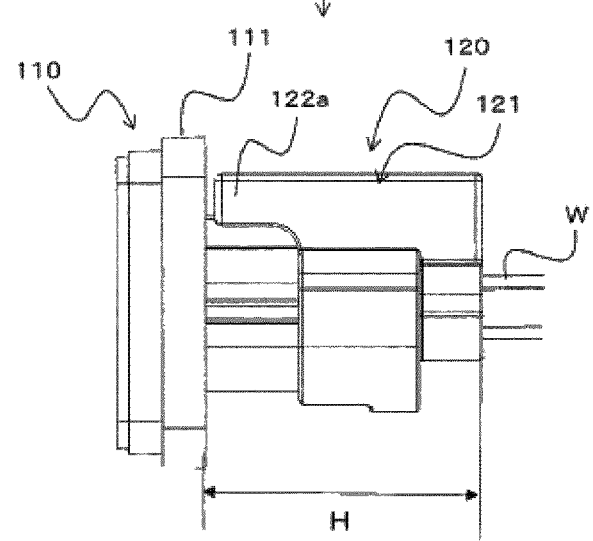

FIG. 1 is an exploded perspective view of a connector 1 for a camera according to an example of the present invention. FIG. 2 is a perspective view of the connector 1 for a camera. FIG. 3 is a side view of the connector 1 for a camera. FIG. 4 is a sectional view of the connector 1 for a camera. FIG. 5 is a perspective view of a first connector housing 10 illustrated in FIG. 1. FIGS. 6A to 6C illustrate the connector 1 for a camera in a state in which a camera housing 50 is attached, FIG. 6A is a perspective view, FIG. 6B is a view from one side surface on a locking arm 23 side, and FIG. 6C is a side view.

Note that, FIGS. 6A to 6C illustrate views in which an electric wire W is omitted.

The connector 1 for a camera according to the example of the present invention is a vehicle-mounted connector and includes a first connector housing 10 that is provided with a first terminal 17 (see FIG. 4) as an electrical connecting portion of a camera functioning component, and a flange 13 with which a terminal-edge surface of a camera housing 50 comes into contact with such that the camera housing 50 is assembled with the first connector housing, a second connector housing 20 in which a second terminal 26 that is connected to the first terminal 17 is accommodated and into which the first connector housing 10 is fitted, a holding member 30 that is mounted at a front end of the second connector housing 20, thereby demarcating a terminal accommodating chamber 21a, which will be described below, of the second connector housing 20, and is provided with an abutting surface that abuts on a front end surface inside the first connector housing 10, and a hooking member 40 which is attached to the second connector housing 20, thereby hooking the second terminal 26 accommodated in the terminal accommodating chamber 21a.

Note that, in the example, the second terminal 26 is a female terminal attached to a terminal end portion of the electric wire W, as illustrated in FIG. 1. In addition, the electric wire W has a rubber plug S1 that is attached on the periphery of an end portion of the second terminal 26, and thereby the second terminal 26 is accommodated in the second connector housing 20 in a waterproof manner.

The first connector housing 10, in which a plurality of male terminals as the first terminals 17 are accommodated, is provided with a first fitting portion 11 as a portion that is fitted into the second connector housing 20, and a case portion 12 that configures an accommodating space of a camera functioning component, in cooperation with the camera housing 50. The flange 13 is provided to from a contact surface 13a along an outer circumferential surface of the case portion 12 and the terminal-edge surface of the camera housing 50 comes into contact with the contact surface.

The outline of a cross section of the first fitting portion 11 has a substantially rectangular cylinder shape orthogonal to the fitting direction of the first connector housing 10 and the second connector housing 20 (hereinafter, simply referred to as the "fitting direction"), and the plurality of first terminals 17 are held and accommodated in the first fitting portion such that tips of the first terminals face a fitting port 11a.

The first terminals 17 are held at predetermined positions in the first fitting portion 11 through press-fitting or insert forming.

The first fitting portion 11 is disposed at a position shifted to one-side surface side 13b of the flange 13, and has a surface facing a shifting direction (an arrow D direction in FIG. 5), on which a locked portion 11b is provided to perform locking in cooperation with the locking arm 23 of the second connector housing 20.

The locked portion 11b is a protrusion provided with a inclined surface on a surface facing the fitting port 11a such that a hooking portion 23c, which will be described below, easily runs over when the hooking portion performs hooking.

The case portion 12 is provided with a rectangular bottom wall portion 12a that forms a bottom surface of the accommodating space of the camera functioning component in an end portion of the case portion on a side opposite to the fitting port 11a of the first fitting portion 11, and a frame wall portion 12b provided to be upright along an edge of the bottom wall portion 12a.

The flange 13 projects to form a step from an outer circumferential surface of the frame wall portion 12b along an outer circumference of an end portion on a bottom wall portion side of the frame wall portion 12b.

In addition, the flange 13 is provided with a protective-wall avoiding portion 14 that avoids a portion that overlaps a projecting protective wall 25, which will be described below, of the second connector housing 20.

The protective-wall avoiding portion 14 has a recessed shape having a pair of recessed edge surfaces 14a and 14a that faces both side walls of the projecting protective wall 25 with a slight gap therebetween, in a state in which the first connector housing 10 is fitted in the second connector housing 20.

The first connector housing 10 is provided with a flat surface 15 that is continuous from one end of the case portion 12 in the fitting direction to the fitting port 11a of the first fitting portion 11 and that faces the shifting direction of the first fitting portion 11, and the locked portion 11b projects on the flat surface 15.

In addition, a pair of guide ribs 16 and 16 is provided on both edges of the flat surface 15 so as to extend in the fitting direction. The pair of guide ribs 16 and 16 is positioned between a pair of side-portion protective walls 24a, which will be described below, of a locking protective wall 24, and has a function of guiding movement of the first connector housing 10 and the second connector housing 20 in the fitting direction.

The second connector housing 20 is provided with a second fitting portion 21 as a portion into which the first fitting portion 11 is fitted, and a terminal inserting portion 22 provided with a plurality of terminal inserting ports 22a through which the second terminal 26 is inserted into the second fitting portion 21. The second connector housing has a block shape formed of an insulating resin material and has one end on a fitting port 21d and the other end on the terminal inserting port 22a.

In addition, the second connector housing 20 is provided with the locking arm 23 that is locked to the locked portion 11b provided in the first connector housing 10, and the locking protective wall 24 that protects the locking arm 23 with a wall including the projecting protective wall 25 projecting to a front side in the fitting direction toward the first connector housing 10.

In a case where the first connector housing 10 is fitted in the second connector housing 20, the locking arm 23 is locked with the locked portion 11b in a state in which the projecting protective wall 25 overlaps the flange 13 in a direction orthogonal to the fitting direction.

The second fitting portion 21 is provided with a plurality of terminal accommodating chambers 21a in which a plurality of second terminals 26 are accommodated, respectively, an inner fitting portion 21b that is, along with the holding member 30, fitted in the first fitting portion 11 to a terminal end position in a state in which the holding member 30 is set, and an outer fitting wall 21c which forms an outer wall of the second fitting portion 21 and in which the first fitting portion 11 is fitted such that the outer fitting wall overlaps an outer side of the first fitting portion 11.

As described above, the connector 1 for a camera has a double fitting structure with the inner fitting portion 21b and the outer fitting wall 21c. In a state in which the first connector housing 10 is fitted in the second connector housing 20, the periphery of an end portion of the fitting port of the first fitting portion 11 is disposed between the inner fitting portion 21b and the outer fitting wall 21c, and an elastic seal member S2 seals a space between the inner fitting portion 21b and the first fitting portion 11 in a waterproof manner.

The second fitting portion 21 is provided with the locking arm 23 and the locking protective wall 24 on a surface 21e of the second fitting portion 21 facing the shifting direction of the first fitting portion 11.

The locking arm 23 is provided with a fulcrum portion 23a provided in an end portion of the terminal inserting portion 22, a pair of arms 23b and 23b that extends from the fulcrum portion 23a in a direction in which the fitting of the first connector housing 10 is performed, a hooking portion 23c that is provided to bridge a span between the tips of the pair of arms 23b and 23b and that is a portion which is hooked on the locked portion 11b in an elastically neutral state of the pair of arms 23b and 23b, and an unlocking operation portion 23d that is provided in an end portion of the arm extending from the hooking portion 23c side in a direction opposite to the extending direction of the arm portion 23b and that is a portion on which a user performs a press operation when unlocking is performed.

The locking protective wall 24 extends to a position in parallel with an extending direction of the arms 23b on outer sides of sides of the arms 23b, and projects from a position parallel to the unlocking operation portion 23d to the front side in the fitting direction toward the first connector housing 10, farther than the hooking portion 23c, and thereby the locking protective wall is provided with a pair of side-portion protective walls 24a and 24a that protects both sides of the locking arm 23, and a front-end-portion protective wall 24b that protects a front end portion of the locking arm 23 by bridging the front end side of the pair of side-portion protective walls 24a and 24a.

The pair of side-portion protective walls 24a and 24a is provided to be upright on one-side surfaces of the outer fitting walls 21c so as to project from both end sides of the outer fitting wall 21c in the fitting direction.

In addition, heights of the pair of side-portion protective walls 24a and 24a are adjusted such that the top surfaces thereof are positioned at a position higher than the pair or arms 23b and 23b.

The locking protective wall 24 protects the locking arm 23 from the outside, and thereby the unlocking operation is difficult to be performed in an unintended circumstance.

Here, to more specifically describe the projecting protective wall 25, the locking protective wall 24 has a portion that projects to the front side in the fitting direction toward the first connector housing 10 farther than the outer fitting wall 21c in the fitting direction.

The second connector housing 20 is provided with the locking arm 23 and the locking protective wall 24 on a surface of the second fitting portion 21, which faces the shifting direction of the first fitting portion 11, the projecting protective wall 25 is disposed at a position closer to the first fitting portion 11 in the shifting direction, and thereby the portion in which the projecting protective wall 25 overlaps the flange 13 is reduced.

In addition, the projecting protective wall 25 has a shape in which a portion thereof overlapping the outer side of the first fitting portion 11 is reduced, and projects from an end surface side of the fitting port of the second fitting portion 21 in the fitting direction.

More specifically, the projecting protective wall 25 has a portion projecting to the front side with respect to the outer fitting wall 21c in the fitting direction toward the first connector housing 10, and the portion has a round edge surface formed along the terminal-edge surface on the front side of the outer fitting wall 21c in the fitting direction.

Therefore, as illustrated in FIG. 3, in the connector 1 for a camera, in the fitting state of the first connector housing 10 in the second connector housing 20, the overlapping portion between the first fitting portion 11 and the projecting protective wall 25 is reduced such that it is possible to see an outer surface of the first fitting portion 11, which is viewed on the front side in the fitting direction from the end surface of the fitting port of the second fitting portion 21, without interference of the projecting protective wall 25.

Note that, when the portion, in which the projecting protective wall 25 overlaps the flange 13, is reduced, the edge surface may not have the round shape but may have another shape.

In addition, as described above, the protective-wall avoiding portion 14 of the first connector housing 10 has the recessed shape having the pair of recessed edge surfaces 14a and 14a that faces both side walls of the projecting protective wall 25 with slight gaps therebetween, in the state in which the first connector housing 10 is fitted in the second connector housing 20.

Therefore, as illustrated in FIG. 2, in a case where an external force in a width direction (arrow F direction) of the protective-wall avoiding portion 14 is loaded to the electric wire W connected to second terminal 26, both side walls of the projecting protective wall 25 can come into contact with the recessed edge surfaces 14a such that the protective-wall avoiding portion 14 can receive the load produced due to the external force. As a result, it is possible to disperse the external force loaded in the width direction of the protective-wall avoiding portion 14.

In addition, since the projecting protective wall 25 enters a recessed portion formed of the protective-wall avoiding portion 14 in the flange 13, in the connector 1 for a camera, the projecting protective wall 25 is disposed at the position shifted to the one-side surface side 13b of the flange 13, and thereby it is possible to prevent the dimension in a direction (arrow D direction in FIG. 3) parallel to the shifting direction from increasing.

As described before, in the connector 1 for a camera, as illustrated in FIGS. 6A to 6C, the camera housing 50 is assembled such that the terminal-edge surface thereof comes into contact with the flange 13.

The camera housing 50 is formed of a substantially hemispherical surface, and a region around an apex of the hemispherical surface is a lens portion.

In spite of a state in which a part of the contact surface 13a of the flange 13 is missed at the position of the flat surface 15 of the first connector housing 10, since end surfaces of the pair of guide ribs 16 and 16 are provided to be flush with the contact surface 13a of the flange 13, the terminal-edge surface of the camera housing 50 is stably positioned.

Note that the camera housing 50 is not limited to the configuration described in the example, as long as the camera housing comes into contact with the flange 13 so as to be assembled to the first connector housing 10.

Next, operations of the portions in the state in which the first connector housing 10 is released from the fitting in the second connector housing 20 to the fitting state will be described.

First, the plurality of second terminals 26 are accommodated in the terminal accommodating chambers 21a, respectively, and the holding member 30 and the second connector housing 20, to which the hooking member 40 is attached, are caused to move, in the fitting direction, to the position at which the locking arm 23 is locked to the locked portion 11b.

During the movement until the locking arm 23 is locked to the locked portion 11b, when the pair of arms 23b are elastically bent with the fulcrum portion 23a as a fulcrum such that the hooking portion 23c of the locking arm 23 runs over the locked portion 11b, and the hooking portion 23c reaches a locking complete position at which the hooking portion runs over the locked portion 11b, the pair of arms 23b is elastically restored to the neutral state, and thereby hooking portion 23c is hooked to the locked portion 11b.

In addition, at this time, since the projecting protective wall 25 is caused to move so as to pass between the pair of recessed edge surfaces 14a and 14a of the protective-wall avoiding portion 14, the projecting protective wall 25 does not interfere with the fitting of the first connector housing 10 in the second connector housing 20.

In the connector 1 for a camera according to the example of the present invention, the projecting protective wall 25 is provided at the position shifted to the one-side surface side 13b of the flange 13, thereby the overlapping portion with the flange 13 is reduced, and the locking arm 23 and the locked portion 11b are locked to each other in a state in which the projecting protective wall 25 overlaps the flange 13 in the direction orthogonal to the fitting direction. Therefore, it is possible to reduce the dimension in the fitting direction toward the first connector housing 10 in the second connector housing 20 which is locked to the first connector housing 10 via the locking arm 23 protected with the wall of the locking protective wall 24.

In addition, in the connector 1 for a camera according to the example of the present invention, in a case where the external force in the width direction of the protective-wall avoiding portion 14 is loaded to the second terminal 26, both side walls of the projecting protective wall 25 can come into contact with the recessed edge surfaces 14a such that the protective-wall avoiding portion 14 can receive the load produced due to the external force. As a result, it is possible to disperse the external force loaded in the width direction of the protective-wall avoiding portion 14. Further, since the projecting protective wall 25 enters the recessed portion formed of the protective-wall avoiding portion 14 in the flange 13, the projecting protective wall 25 is disposed at the position shifted to the one-side surface side 13b of the flange 13, and thereby it is possible to prevent the dimension in a direction parallel to the shifting direction from increasing.

In addition, in the connector 1 for a camera according to the example of the present invention, in the fitting state of the first connector housing 10 in the second connector housing 20, since the overlapping portion between the first fitting portion 11 and the projecting protective wall 25 is reduced such that it is possible to see an outer surface of the first fitting portion 11, which is viewed on the front side in the fitting direction from an end surface of a fitting port of the second fitting portion 21, without interference of the projecting protective wall 25, it is possible to easily see and check the fitting state of the first connector housing 10 in the second connector housing 20.

Note that, as the connector 1 for a camera according to the example of the present invention, an example that includes the holding member 30 and the hooking member 40 is described; however, the members are not the necessary components of the configuration, the connector may not include the holding member 30 and the hooking member 40.

As described above, the invention made by the inventors is specifically described, based on the example of the invention described above; however, the present invention is not limited to the example of the invention described above, and it is possible to perform various modifications in a range without departing from the gist of the invention.

DESCRIPTION OF REFERENCE NUMERALS AND SIGNS 1 connector for camera
10 first connector housing
11 first fitting portion
11a fitting port
11b locked portion
12 case portion
12a bottom wall portion
12b frame wall portion
13 flange
13a contact surface 13b one side surface
14 protective-wall avoiding portion
14a recessed edge surface
15 flat surface
16 guide rib
17 first terminal
20 second connector housing
21 second fitting portion
21a terminal accommodating chamber
21b inner fitting portion
21c outer fitting wall
21d fitting port
21e surface
22 terminal inserting portion
22a terminal inserting port
23 locking arm
23a fulcrum portion
23b arm portion
23c hooking portion
23d unlocking operation portion
24 locking protective wall
24a side-portion protective wall
24b front-end-portion protective wall
25 projecting protective wall
26 second terminal
30 holding member
40 hooking member
50 camera housing
W electric wire
S1 rubber plug
S2 elastic seal member

What is claimed is:

1. A connector for a camera comprising:
a first connector housing accommodating a first terminal electrically connected to a camera functioning component; and
a second connector housing accommodating a second terminal connected to the first terminal,
wherein the first connector housing includes a flange configured to be contact with a terminal-edge surface of a camera housing which is assembled, a first fitting portion fitted in the second connector housing and disposed at a shifted position shifted from one surface side of the flange, and a locked portion disposed on a surface facing in a first direction orthogonal to a fitting direction,
wherein the second connector housing includes a second fitting portion fitted to the first fitting portion, a locking arm which locks the locked portion, and a locking protective wall including a projecting protective wall projecting to a front side in the fitting direction,
wherein the locking arm and the locking protective wall are located in the first direction and on a surface of the second fitting portion,
wherein, when the second connector housing is fitted to the first connector housing, the projecting protective wall overlaps the flange in the first direction orthogonal to the fitting direction and the locking arm is locked, and
wherein the flange includes a protective-wall avoiding portion which avoids an overlapping portion of the flange with the projecting protective wall.

2. The connector for the camera according to claim 1,
wherein the protective-wall avoiding portion includes a recessed edge surface which faces a side wall of the projecting protective wall through a space, in a state that the first connector housing is fitted in the second connector housing.

3. The connector for the camera according to claim 1,
wherein the projecting protective wall projects from a fitting end surface side of the second fitting portion in the fitting direction so as to reduce a overlapping portion of the flange which overlaps an outer side of the first fitting portion.

* * * * *